July 14, 1959

H. H. THALE 2,894,340

OYSTER DIGGER

Filed Sept. 18, 1956

Harry H. Thale
INVENTOR.

BY *[signatures]*
Attorneys

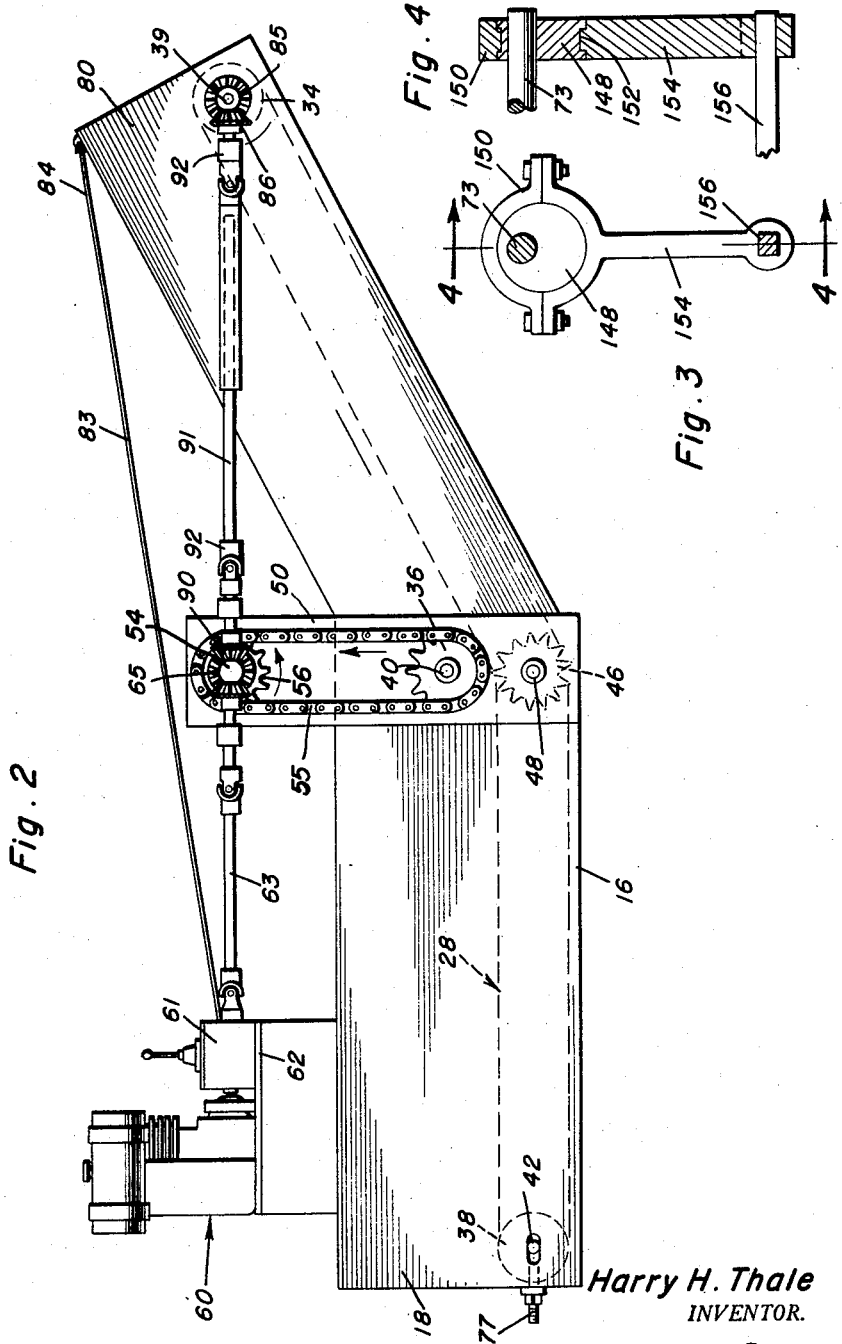

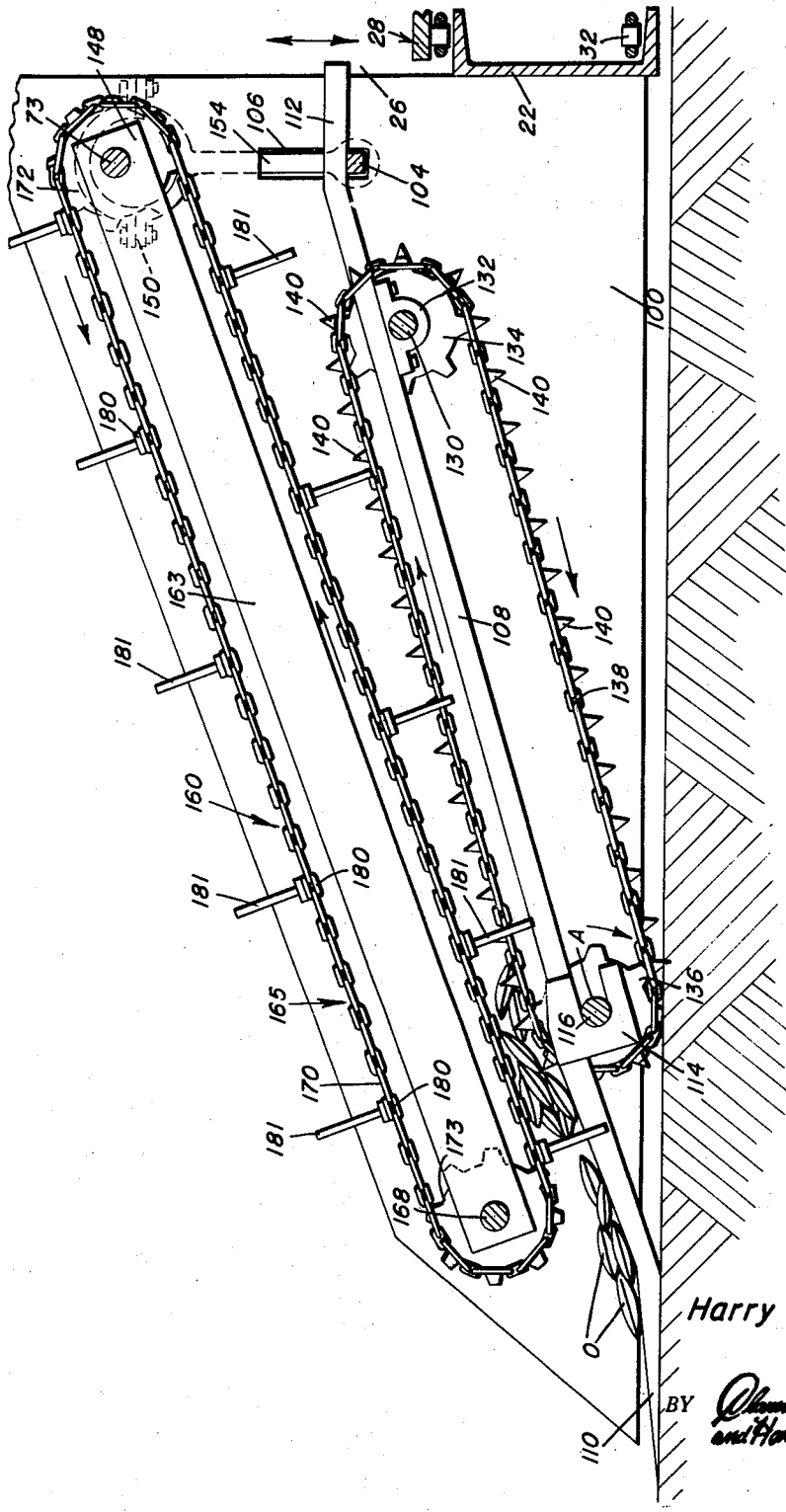

United States Patent Office 2,894,340
Patented July 14, 1959

2,894,340

OYSTER DIGGER

Harry H. Thale, Olympia, Wash.

Application September 18, 1956, Serial No. 610,494

9 Claims. (Cl. 37—55)

This invention relates to a machine for facilitating the digging of oysters from shallow water.

An object of this invention is to provide an oyster digger which automatically digs oysters from shallow water, sifts the dirt and siftable material therefrom while conveying them onto a barge or some other means to support the oysters.

Another object of the invention is to provide an oyster digger which has a lower digger conveyor arranged behind a group of teeth, the teeth being in alignment with the upper flight of the lower conveyor and the lower conveyor being formed with diggers whereby the oysters that are dug up by the advance prongs are facilitated by the diggers, there being automatically operative means for shaking the lower digger conveyor, thereby sifting the dirt from the oysters while conveying them, and in addition there being an upper conveyor having tines which are interleaved with the lower conveyor, the upper conveyor being articulated so as to move upwardly and downwardly when groups of oysters are below it and on the lowermost conveyor. This particular sub-assembly in the oyster digging machine enables harvesting of oysters automatically as the machine is propelled by its own power or by the power of a prime mover.

A further object of the invention is to provide an oyster harvesting machine capable of being propelled in shallow water to harvest the oysters at the bottom thereof, there being means for more easily and efficiently gathering the oysters and at the same time cleaning them, inasmuch as they are gathered between a pair of conveyors, one conveyor being in sections that are articulated, while the other conveyor being oscillated to achieve the combined effect of not only harvesting but cleaning, after which the oysters are dropped onto a moving conveyor which directs them onto a barge or some other type of carrier for the oysters.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side view of the oyster digging machine in Figure 1;

Figure 3 is a fragmentary view showing in elevation the means for oscillating the lower conveyor of the oyster digging part of the machine;

Figure 4 is a sectional view taken on the line 4—4 of Figure 3; and

Figure 5 is a longitudinal sectional view of the part of the machine by which the oysters are gathered from the bottom of the water.

Figure 1:
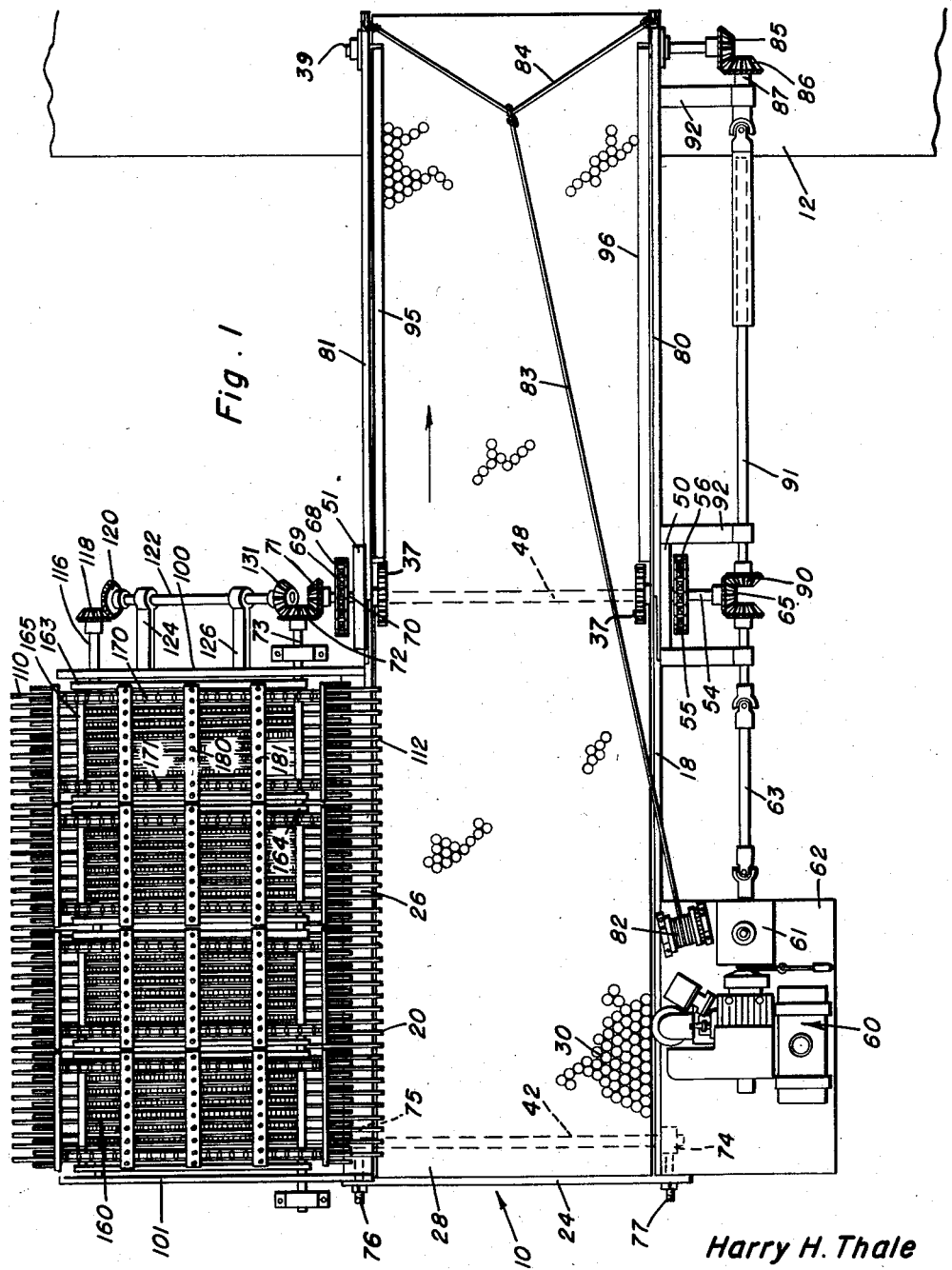
Figure 1 is a top view of a harvester which is made in such a way as to demonstrate the principles of the invention.

In the accompanying drawings there is an oyster digging machine 10 which is constructed in such a manner as to demonstrate the invention. This machine is adapted to be drawn by a tractor or some other prime mover, although it is within the purview of the invention to construct the oyster digger, or oyster digging machine, 10 on a power driven chassis. As shown in Figure 1, the oyster digging machine 10 empties the gathered, cleaned oysters onto barge 12, by which they are transported to another location.

Machine 10 is made of a frame 16, this frame having sides 18 and 20, behind which there are channels 22 (Figure 5) and at the ends of which there are structural framing members 24. Side 20 is low in order to form an entrance 26 for the gathered oysters so that they may be emptied onto the endless conveyor 28 arranged between the sides. Endless conveyor 28 has such construction that articles above a predetermined size fall through the holes 30 therein, whereby the oysters are graded as they are conveyed by conveyor 28. In addition, any foreign matter, as dirt, falls through these holes 30. Conveyor 28, therefore, is made of a pair of side chains 32, which are entrained around three pairs of sprockets 34, 46 and 38 respectively. Sprockets 34 are mounted on shaft 39, while sprockets 46 are mounted on shaft 48 and sprockets 38 are mounted on shaft 42. A wire cloth belt is attached to the upper and lower flights of the chains. Sprockets 37 are mounted in contact with the upper flight of the chains of conveyor 28 and they are each secured to shafts 40 on the opposite sides of the frame. Sprockets 36 are secured to shafts 40 and they are located on the outside of the side plates 18 and 20. Vertical stands 50 and 51 are welded or otherwise attached to the side plates 18 and 20 and have shaft 48 and both shafts 40 extending therethrough. Plate 50 has a short shaft 54 mounted for rotation therein and a chain 55 entrained around a sprocket 56 on shaft 54. This chain is also entrained around sprocket 36 on shaft 40 in order to establish a drive between short shaft 54 and the drive sprockets for the conveyor 28. Engine 60, with accessories including a transmission 61, is mounted on plate 62, the latter protruding laterally from one side of the oyster digger. Articulated shaft 63 drivingly connects shaft 54 with the transmission 61 through bevel gearing 65.

Shaft 48 extends completely across the frame and has a sprocket on the outer extremity thereof to which chain 68 is operatively connected. This chain is also entrained around an upper sprocket 69 on shaft 70, the latter being arranged for free rotation in a bearing in vertical plate 51. Miter gear 71 is fixed to shaft 70 and is enmeshed with another miter gear 72 on an upper shaft 73. Shaft 73 applies power to the oyster digging section of the oyster digging machine.

Shaft 42 is mounted for rotation in bearings 74 and 75, the latter having bolts 76 and 77 connected thereto which pass through holes in the back frame member 24 and which have nuts thereon. In this way the endless conveyor 28 may be tightened or otherwise adjusted. The shaft 39 is also a drive shaft, passing through bearings in sides 80 and 81 of the main frame of the machine. These sides are mounted on shaft 48 so that they are capable of being swung upwardly and downwardly. A winch 82 is disposed on plate 62 and has a cable 83 entrained therearound. Bridle 84 connects the cable to the outer extremity of the conveyor sides 80 and 81 so that the end of the conveyor may be raised and lowered in accordance with the desires of the user.

Miter gears 85 and 86 that are enmeshed with each other and are fixed to shaft 39 and shaft 87 respectively and are used to deliver power from the engine to the outer extremity of the endless conveyor and at the same rate that power is delivered to the conveyor at the center thereof. This is accomplished by gear selection and design.

Miter gear 90 is enmeshed with a similar gear 65 and is connected to the end of extensible shaft 91, the latter being mounted in supports 92 that have bearings on the ends thereof and that are fixed to the side 80 of the conveyor part of the machine. The extensible shaft 91 is formed by two sections telescopingly arranged with each other and having non-circular cross sections so as to establish a drive therebetween. Where it is found necessary or desirable universal joints are interposed in the power train. To assure that the endless conveyor will track properly regardless of the adjustment thereof, guides 95 and 96 are welded or otherwise secured to the inner surfaces of sides 80 and 81 and overlie the top flight of the endless conveyor 28.

The oyster gathering part of the machine (Figure 5) is an important part of this invention. It consists of two sides 100 and 101 that are fixed to the side 20 below entrance 26 so that oysters O that are gathered from the bottom of the water are delivered through the entrance 26 and deposited onto the endless conveyor 28 so that they may be carried to the barge 12 and dropped thereon. A transverse bar 104 extends through opposed slots 106 in the sides 100 and 101 and has a plurality of spaced bars 108 fixed thereto. The front ends of the bars 108 are pointed to form digger teeth 110, while the rear ends of the bars 108 are arranged parallel to form teeth 112, and the group of teeth constitutes a grate over which the oysters are guided through entrance 26 in order to fall on the conveyor 28. Saddle bearings 114 are fixed onto the bars 108 and have shaft 116 located in the seats thereof. Shaft 116 has a miter gear 118 at one end, the miter gear being enmeshed with another miter gear 120. The latter gear is on shaft 122, which is supported by bearing supports 124 and 126 on the side 100. Gear 131 is fixed to shaft 122 and is enmeshed with miter gear 72 so that the torque applied to shaft 73 is also applied to shaft 116 through shaft 122 and its gearing.

Shaft 130 is mounted for rotation in bearings 132 that are secured to some of the bars 108. An upper pair of sprockets 134 is mounted on shaft 130, while a lower pair of sprockets 136 is fixed to shaft 116. Chain conveyor 138 is entrained around the two pairs of sprockets 134 and 136 and this conveyor constitutes a part of the digger section for the oyster gathering machine. Teeth 110 are arranged in advance of conveyor 138, and the latter has a number of sharp bars 140 extending transversely across the upper and lower flights thereof, these bars being adapted to dig slightly into the bottom of the body of water from which the oysters O are gathered.

Shaft 73 is passed through bearings in the sides 100 and 101 and has two eccentrics 148 (Figures 3 and 4) secured thereto. Bearings 150 hold the eccentrics captive therein and are preferably interlocked by a tongue and groove assembly 152 (Figure 4). Connecting rods 154 from the bearings are secured to the transverse bar 104. Accordingly, the lower conveyor is oscillated in response to rotation of shaft 73. Shaft 73 rotates simultaneously with actuation of conveyor 28. Therefore, the machine as described so far is operated in proper time sequence.

The digging section includes, in addition to the lower conveyor, an upper conveyor 160. Conveyor 160 is sectional and is capable of being articulated so as to ride over clumps of oysters that are gathered. The function of articulated conveyor 160 is to help propel the oysters up to the entrance 26 and eject them onto conveyor 28. Conveyor 160 has four identical sections (Figure 1), although the number thereof has been arbitrarily selected. There may be more or less sections in the articulated conveyor 160. The illustrated structure, though, consists of shaft 73 extending entirely across sides 100 and 101, and for each section there is a pair of sides, for example, sides 163 and 164 for section 165. The sides have holes at their upper ends through which shaft 73 is passed. The sides have holes in their lower ends in which idler shaft 168 is mounted for rotation. Completing the make-up of section 165 is a pair of chains 170 and 171 entrained over an upper pair of sprockets 172 and a lower pair of sprockets 173 on shafts 73 and 168 respectively. Transverse bars or cleats 180 extend across and are attached to the pair of chains, and each bar has a row of tines 181 protruding therefrom. The tines are interdigitated with teeth 110 and are adapted to slide between saddle bearings 114 and a part of the bars 108, forming with the lower conveyor of the digging section of the machine closed pockets in which to accommodate oysters as they are propelled up the digging section for deposit, first onto the grate 112, then through entrance 26 onto conveyor 28. Inasmuch as each section of the articulated conveyor is independent for oscillation about shaft 73 as an axis, the upper conveyor is capable of yielding upwardly and moving downwardly, depending on the quantity of oysters that is arranged between the pair of conveyors 160 and the lowermost conveyor 138 in the digging section of the machine.

In operation, the oyster digging machine 10 is moved into the water so that the digging section thereof moves along the bottom surface and into the oyster beds. As the machine is propelled forward, teeth 110 dig into the bed, and due to the forward motion of the machine the oysters O slide on the teeth and between the upper articulated conveyor and the lower digging conveyor. At the same time, the upper articulated conveyor 160 moves so that the lower flight is being propelled in the same direction as the upper flight of the lower digging conveyor. The tines 181 form with the conveyor below it pockets in which to accommodate oysters. All during the conveying of the oysters on the lower conveyor, it is reciprocated, moving in an oscillatory path and shaking the majority of the dirt and other foreign matter from the oysters.

Then the oysters pass over the teeth 112 and onto the conveyor 28, whence they are delivered onto the barge 12. During the movement of the oysters on conveyor 28, they are graded by the holes 30 and additional dirt or other material is dropped from the oysters during this part of the procedure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An oyster digger machine comprising a frame, a digger section connected to said frame, said digger section including an upper and lower conveyor which are moving in such direction that the confronting flights thereof are propelled in the same direction to form therebetween a pocket within which to accommodate oysters, means in advance of said conveyors for digging the oysters and delivering them into said pocket, an endless conveyor having classifying openings therein and carried by said frame, the last mentioned conveyor being at the discharge end of said pocket so that oysters from said digging section are delivered onto said last mentioned conveyor and classified prior to dropping into a barge or other container, a plurality of bars located between the conveyors of said digger section, and said bars being spaced from each other and having teeth at the rear ends thereof in order to form a grate through which foreign matter may fall as the oysters are propelled thereover.

2. An oyster digger machine comprising a frame, a digger section connected to said frame, said digger section including an upper and lower conveyor which are moving in such direction that the confronting flights thereof are propelled in the same direction to form therebetween a pocket within which to accommodate oysters, means in advance of said conveyors for digging the oysters and delivering them into said pocket, an endless conveyor having classifying openings therein and carried by said frame, the last mentioned conveyor being at the discharge end of said pocket so that oysters from said digging section are delivered onto said last mentioned conveyor and classified prior to dropping into a barge or other container, means for actuating said conveyors, said means including a mechanical movement which oscillates the digger conveyor of said section.

3. The machine of claim 2 wherein there is a plurality of bars located between the conveyors of said digger section, said bars being spaced from each other and having teeth at the rear ends thereof in order to form a grate through which foreign matter may fall as the oysters are propelled thereover, said digger section including a pair of sides which carry the conveyors of said digger section, a plurality of bars located between said conveyors of said digger section, one of the shafts of one of said conveyors of said digger section forming a pivot for the lower conveyor, and means operatively connected with said bars to oscillate said lower conveyor.

4. The machine of claim 3 wherein the upper conveyor of said digger section has a plurality of cleats, rows of tines secured to said cleats and interdigitated with the teeth of said digger section when said upper conveyor is actuated.

5. In an oyster digging machine, the combination of a frame, a digging section, said digging section including an upper conveyor and a lower digging conveyor, said upper conveyor consisting of at least two sections that are juxtaposed to each other, each section being independently movable, whereby the sections of said upper conveyor are articulatable, said lower digging conveyor having an upper flight which moves in the same direction as the lower flights of the sections of said upper conveyor and being spaced slightly therefrom to form a pocket for the oysters between said conveyors, digging teeth in advance of said conveyors and having ends which are arranged to discharge the oysters into said pocket, and means operatively connected with said digger conveyor for oscillating said digger conveyor.

6. In an oyster digging machine, the combination of a frame, a digging section, said digging section including an upper conveyor and a lower digging conveyor, said upper conveyor consisting of at least two sections that are juxtaposed to each other, each section being independently movable, whereby the sections of said upper conveyor are articulatable, said lower digging conveyor having an upper flight which moves in the same direction as the lower flights of the sections of said upper conveyor and being spaced slightly therefrom to form a pocket for the oysters between said conveyors, digging teeth in advance of said conveyors and having ends which are arranged to discharge the oysters into said pocket, means operatively connected with said digger conveyor for oscillating said digger conveyor, a plurality of bars forming a part of said oscillating means and the support to which said digger conveyor is secured, said bars having teeth at their inner ends which form a grate over which the oysters are adapted to be propelled.

7. The machine of claim 6 and a delivery conveyor carried by said frame, said delivery conveyor having an entrance which is in registry with said teeth of said bars, said delivery conveyor having a plurality of classifying apertures through which foreign matter is adapted to fall in order to be separated from the oysters.

8. The machine of claim 7 wherein said delivery conveyor has a front and rear part, said entrance to said delivery conveyor being in said rear part, said front part being pivotally connected to said rear part of said delivery conveyor, and means to adjustably elevate said front part with respect to said rear part of said conveyor.

9. An oyster digging machine comprising a combination of a frame, a digger section adapted to be propelled along the bottom of an oyster bed, means on said digger section for digging into the bed and delivering the oysters while shaking them, and a discharge conveyor in registry with said means for accepting the oysters after they have been dug and shaken in order to discharge them at a remote point, said means including an upper articulated conveyor which is adjustable automatically in response to the thickness of the groups of oysters that are dug, and a lower digging conveyor superposed with respect to the articulated conveyor and having a flight which moves in the same direction and adjacent to the lower flight of said articulated conveyor, means for oscillating said lower digging conveyor while it is in motion, and said lower digging conveyor having teeth which are adapted to dig into the bed.

References Cited in the file of this patent

UNITED STATES PATENTS

| | | | |
|---|---|---|---|
| 625,543 | Davis | May 23, | 1899 |
| 1,019,601 | Collier | Mar. 5, | 1912 |
| 1,160,533 | Schilling | Nov. 16, | 1915 |
| 1,478,142 | Ortmann | Dec. 18, | 1923 |
| 2,288,701 | Heden | July 7, | 1942 |
| 2,386,295 | Daniels | Oct. 9, | 1945 |
| 2,598,223 | Chase | May 27, | 1952 |